(12) United States Patent
Krishnaswamy et al.

(10) Patent No.: US 7,725,039 B2
(45) Date of Patent: May 25, 2010

(54) METHOD AND APPARATUS FOR AUTOMATIC PORT INTERCONNECTION DISCOVERY IN AN OPTICAL NETWORK

(75) Inventors: Murali Krishnaswamy, Piscataway, NJ (US); Jefferson L. Wagener, New Hope, PA (US); Xiaowen Mang, Manalapan, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 2509 days.

(21) Appl. No.: 09/908,459

(22) Filed: Jul. 18, 2001

(65) Prior Publication Data
US 2003/0020976 A1 Jan. 30, 2003

(51) Int. Cl.
*H04B 10/24* (2006.01)
(52) U.S. Cl. .................. 398/165; 398/70
(58) Field of Classification Search .......... 398/25, 398/37, 30–32, 9, 7, 3, 70, 165; 370/400, 370/401, 462, 398, 251, 252, 254, 256, 258
See application file for complete search history.

(56) References Cited

U.S. PATENT DOCUMENTS

| | | | | |
|---|---|---|---|---|
| 5,729,685 A * | 3/1998 | Chatwani et al. | ............. | 709/224 |
| 5,740,346 A * | 4/1998 | Wicki et al. | ................... | 714/22 |
| 6,370,146 B1 * | 4/2002 | Higgins et al. | ............... | 370/400 |
| 6,377,543 B1 * | 4/2002 | Grover et al. | ................ | 370/227 |
| 6,549,513 B1 * | 4/2003 | Chao et al. | .................... | 370/227 |
| 6,594,044 B1 * | 7/2003 | Buchanan et al. | ............. | 398/58 |
| 6,654,802 B1 * | 11/2003 | Oliva et al. | .................. | 709/224 |
| 6,657,973 B1 * | 12/2003 | Arima | ......................... | 370/254 |
| 6,681,248 B1 * | 1/2004 | Sears et al. | .................. | 709/223 |
| 6,728,486 B1 * | 4/2004 | Hutchison et al. | ............. | 398/83 |
| 2002/0126342 A1 * | 9/2002 | Wetzel et al. | ................ | 359/117 |
| 2002/0174168 A1 * | 11/2002 | Beukema et al. | ............ | 709/201 |

* cited by examiner

*Primary Examiner*—Leslie Pascal
(74) *Attorney, Agent, or Firm*—Mayer & Williams PC; Stuart H. Mayer, Esq.; Karin L. Williams, Esq.

(57) ABSTRACT

To automatically discover the port connections for all nodes in a network, a master node generates a predetermined optical signal and transmits the predetermined optical signal to a neighboring node, which signal identifies the port on which the master node transmitted the predetermined signal. The recipient transmits a reply signal to the predecessor node and to the master node via a control channel, which identifies a port on which the predetermined optical signal was received by the neighboring node. By successively repeating this process in a methodical manner, the master node can discover all of the port interconnections in the optical network. Also each node can discover all its port interconnections to its neighbors. Moreover, by selecting controlling the state (e.g., terminate, open) of the ports of the non-master nodes in the network, the master node can control which nodes receive the predetermined signal, thereby ensuring proper port discovery.

8 Claims, 4 Drawing Sheets

METHOD AND APPARATUS FOR AUTOMATIC PORT INTERCONNECTION DISCOVERY IN AN OPTICAL NETWORK

BACKGROUND OF THE INVENTION

The present invention relates generally to methods and apparatuses for provisioning communications channels in telecommunication or computer networks, and more particularly to a method and apparatus for provisioning communications channels in a telecommunications or computer network that operates optically.

Communications networks, including optical communications networks, generally comprise many nodes at which the data stream is coupled from one incoming port to an outgoing port to route the data stream to the desired destination. An example of an optical node is an optical cross-connect or optical add-drop multiplexer.

In an optical network, in addition to the payload channels, each network node is sometimes connected to its adjacent or neighboring nodes and a master node by a control channel. Each network node may have many incoming and outgoing ports, e.g., 4, 8, 16, 64, etc. Each port is connected to a port on a neighboring node. Multiple ports one on node may be connected to the same node on their terminal side. However, each port on a node is terminated in only one other port.

When provisioning connections in any network, including optical networks, it is necessary to identify the port interconnections between adjacent nodes (e.g., ONNs) before attempting to setup channel connections, such as optical channel connections in an optical network cross-connect. Manually identifying the node interconnections and populating a port adjacency table in each node is possible, but cumbersome, even if the table is subsequently dynamically updated as and when connections are made and released. This is particularly problematic when the numbers of ports per node are large. Moreover, as data networks are ever increasing in size, manual techniques for identifying the ports will become increasingly tedious.

Currently, an automatic method for port interconnection discovery in all-optical cross-connect-based network does not exist. Although such a scheme may be feasible in an optical-electrical cross-connect-based network, in which optical-electrical-optical conversion takes place in each optical network node (ONN), techniques for automated port interconnection discovery are limited due to the lack of optical to electrical conversion in an all-optical cross-connect. Moreover, in an optical communication network, some nodes are not capable of generating an information-bearing signal that can be transmitted over one of the optical communications payload channels. This is because the node lacks the ability to convert a signal from the electrical domain to the optical domain. It is the precise ability of the node to operate completely optically that allows the node to operate at extremely high speeds. Consequently, requiring an electrical conversion in the process would unduly limit the operating speed or increase the cost. As a result, techniques for automatically provisioning nodes in an optical/electrical communications network are not possible in all-optical communications networks.

The present invention is therefore directed to the problem of developing a method and apparatus for automated port interconnection discovery in an optical network employing optical cross-connects that operate completely optically (i.e., all-optical).

SUMMARY OF THE INVENTION

The present invention solves this and other problems by, inter alia, generating a predetermined optical signal at a first node, transmitting the predetermined optical signal from the first node to a neighboring node, which signal identifies the port on which the first node transmitted the predetermined signal, and transmitting a reply signal from the neighboring node to its predecessor node and to the first node via a control channel, which identifies a port on which the predetermined optical signal was received by the neighboring node. By successively repeating this process in a methodical manner, the first node can discover all of the port interconnections in the optical network. Also each node can discover all its port interconnections to its neighbors. Moreover, by selecting controlling the state (e.g., terminate, open) of the ports of the secondary nodes in the network, the first node can control which nodes receive the predetermined signal, thereby ensuring proper port discovery.

In one embodiment of the invention, the first node is a master node and the secondary nodes are non-master nodes.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides, inter alia, a technique for an Optical Network node (ONN) in an optical data network to automatically discover its port interconnections without requiring a signal to be generated with an optical-cross connect. In this document, ONN and node are used interchangeably. As used herein, an optical network node is any node having one or more incoming ports and one or more outgoing ports. Examples of optical network nodes include: optical cross-connects, optical add-drop multiplexers, optical terminal multiplexers, etc.

Moreover, herein the terms port and channel are used interchangeably. However, a channel is more accurately two ports coupled together by a communication medium. Thus, a port is either the input or the output of a channel, although, herein the terms are often used interchangeably.

Figure 1:
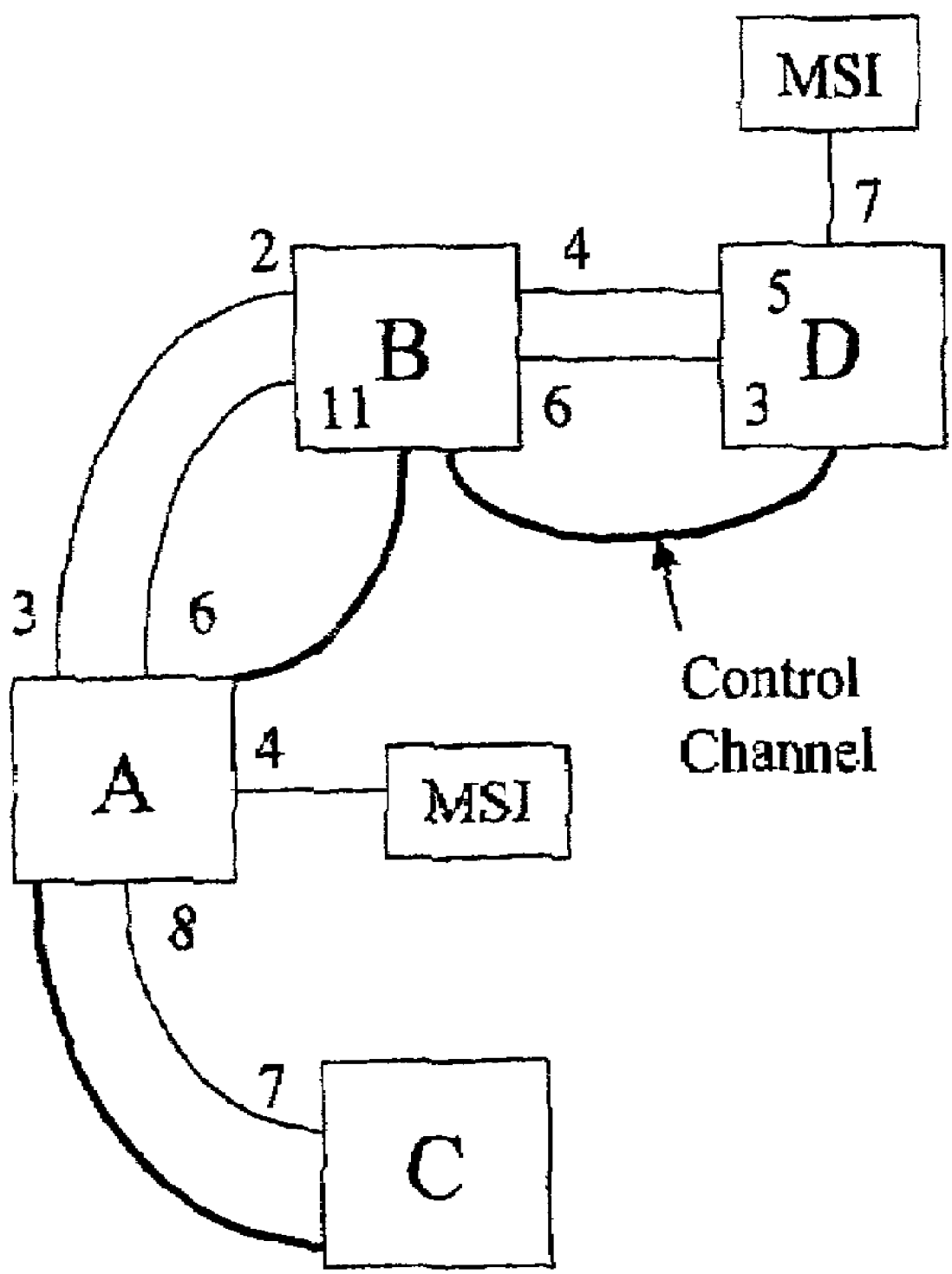
FIG. 1 depicts an exemplary embodiment of an optical network to which various embodiments of a method according to the present invention are applicable.

Turning to FIG. 1, if one needs to set up an optical channel connection (e.g., a light path) between node A 101 and node B 102, the only two possible ports on node A 101 are port 3 and port 6. Of these two ports, port 3 is unavailable (see the ONN A—Port Adjacency Table below).

| Adjacent Node | Local Port | Remote Port | Port Type Oc48/92/na 1/2/8 | Port Available 0 = No, 1 = Yes |
|---|---|---|---|---|
| B | 3 | 2 | 8 | 0 |
| B | 6 | 11 | 8 | 1 |
| C | 8 | 7 | 8 | 0 |
| None | 4 | None | 1 | 1 |

Hence, port 6 is the only port of choice. Similar to node A 101, node B 102 also maintains its own Port Adjacency Table, hence node B knows port A6 is connected to port B11.

The Port Adjacency Table on each node may be manually configured during start-up or initialization. At this time, probably all the ports would be marked as "Available". When a new optical channel connection needs to be setup, e.g., between port A4 and port D7 through node B, then the problem is one of determining the right ports on each of node A 101, node B 102 and node D 104

For this example, assume there is already another traffic flowing in channel B6-D3; hence, channel B6-D3 is unavailable. Consequently, the only possible connection path between node B 102 and node D 104 is channel B4-D5. As a result, the full connection path between port A4 and port D7 is: path A4-A6-B11-B4-D5-D7.

Note that in the above case only the source and destination information (A4 and D7) and the intermediate node B 102 are known. All other intermediate ports (A6 . . . D5) need to be discovered automatically.

To set up a connection between ports A4 and D7 through node B 102, ONN A 101 sends a connection request to node D 104 along node B 102. For example, the request can be a message such as the following:

Setup a connection between ports A4 and D7 through node B 102.

The connection request flows along the control channel 105 only. Control channel 105 is terminated on each node (101-104) and the request/other information in the control channel 105 is interpreted by each node (101-104). Hence, the selection of the ports between node B 102 and node D 104 will be done by node B 102 and node A 101 is unaware of this selection. After node B 102 selects the ports between node B 102 and node D 104, it can signal the information back to node A over the control channel 105.

Note that all requests for connection (and tear down) flow ONLY over the control channel 105. The other port connections are called optical channel connections (also known as data connections or bearer channels) and these are purely light paths traveling all the way from the source CIC card 106 (via port A4) to destination CIC card 107 (via port D7). It is through the Customer Interface Cards (CICs) present in an optical node that a customer sends and receives his/her data traffic over the network. Using only the control channel 105, one can keep track of this optical channel connection.

Based on this connection path, optical cross-connects are made on node A 101 (A4-A6), node B 102 (B11-B4) and node D 104 (D5-D7), thereby forming an end-to-end optical channel connection. After this, the Port Adjacency Tables in node A 101, node B 102 and node D 104 are updated and ports A4, A6, B11, B4, D5 and D7 are marked as unavailable (in other words, a channel exists from A4-A6-B11-B4-D5-D7). When this connection (A4-A6-B11-B4-D5-D7) is torn down, the above set of ports are remarked as available for new connections.

Manual mapping is cumbersome—even for a small network—to accurately compute and populate the information to all the nodes. This manual process may be acceptable for a 16 node, 16-channel (port) network. However, scaling this to a large network with as few as 64 channels becomes cumbersome. If mistakes are made in the map table or in the physical connections during this manual process, diagnosing the errors is rather difficult.

High Level View

According to one aspect of the present invention, the CIC card is enabled to send various special signals (e.g., optical patterns) over the optical channels, but not the control channel. The special signals are termed Variable Modulation (VM). VM is encoded in such a way as to represent a node name and port number (e.g. A6), which information is termed a Label, and which Label is automatically generated. The ONNs have optical monitors on each of its ports, known as Port Monitors (PM). The PM detects the VM and the ONN deciphers the Label. When a node receives a Label from its neighbor, (the Label has the neighbor's node name and the port over which it was sent) it correlates the Label with its own node name and the port on which it was received using the PM. Thus, the node discovers to what neighboring node and port (on that neighbor) to which that this particular receiving port is connected. The node then transfers this Port Adjacency information to that neighbor, and the master node. Thus, two neighboring nodes maintain identical Port Interconnection details.

The mechanisms of generating the right Label, directing it to the right destination, coordinating orderly discovery of the Port Interconnections between neighbors over an entire network are described in subsequent paragraphs.

Variable Modulation

Variable Modulation is a low frequency signal, compared to the high bit-rate of the optical channels, which low frequency signal can be generated by a CIC card. As the name modulation indicates, VM is a user definable signal or pattern. A CIC card can generate VM only when it is not generating its normal payload traffic, i.e., when it is idle. In other words, the system does not mix VM with real traffic.

Figure 4:
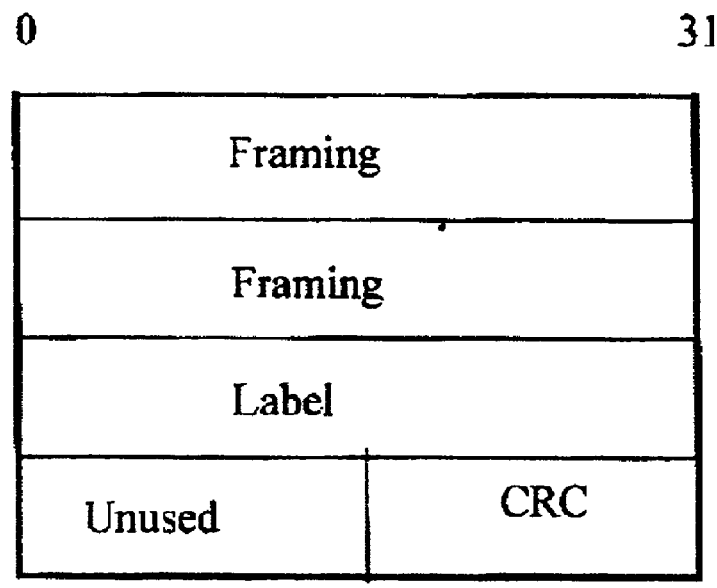
FIG. 4 depicts an exemplary embodiment of a packet structure for use in a variable modulation signal according to another aspect of the present invention.

FIG. 4 depicts the packet format of the VM signal. One possible embodiment of the VM signal is a 4×32-bit packet. The first 2×32 bits consist of framing to enable the recipient to determine the start of a valid VM packet. The next 32 bits comprise the label, e.g., node ID and port ID. A 16-bit cyclic redundancy code is appended to the end to enable error detection. In this embodiment, a remaining 16 bits is unused.

Port (ONN) Modes

The ports on the ONN can be put in OPEN and TERMINATE modes. In the OPEN mode, the ports allow light to pass through them to another port—this can be its connected port on its neighbor or can be another port on the same node to which it is cross-connected. In the TERMINATE mode, as the name indicates, no light is allowed to pass through.

Port Interconnection Discovery Mechanism

Figure 2:
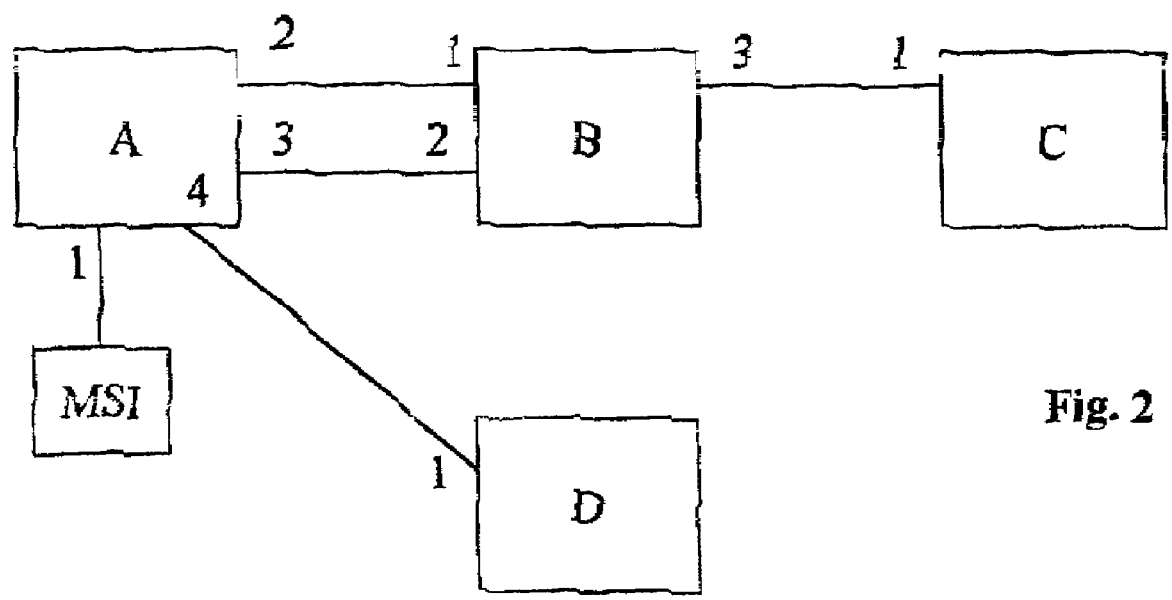
FIG. 2 depicts another exemplary embodiment of an optical network to which various embodiments of a method according to the present invention are applicable.

Turning to FIG. 2, one (or more) ONN that has at least one CIC card is configured as the Master. The information as to which node is the Master is configured in all the ONNs. All the ports in the Master are in the OPEN mode. All other ONN ports are in TERMINATE mode.

Master A has an CIC card attached to port 1 and uses this CIC card to launch VM signals to the network. Master A launches VM signals through each of its other ports successively (2, 3 and 4).

First Master A launches the VM signal through port 2 (i.e., Master A does a cross-connect in A, A1-A2). The Label (i.e., VM) is A2 (this encoding is automatically done by software). The signal A2 is received by the neighboring ONN B on port 1, which is detected by the port monitor on B. Hence, node B knows that B1 is connected to A2. Node B then informs this A2-B1 interconnection information to node A, through the control channel, not shown. Next, node B puts both its ports 1 and 3 in the OPEN mode and cross-connects 1 and 3. Next, a new signal is launched by A1 and it goes to C1 through A1-A2-B1-B3. The Label in this case is encoded as B3. Node C on receiving this on port 1 knows that B3-C1 is interconnected and informs this to B.

Master node A then sends a signal from A1 to A3 and thereon to B2 for identifying the A3-B2 interconnection. In this case, the Label sent is A3. Then Node A probes A4-D1 and so on. The Label information is software configurable and it is always a destination node's predecessor node ID and port number.

Reliable Discovery Algorithm

In a large network, it is essential to send the VM signals in an orderly manner over one node after another and one port and another for complete discovery of all the port interconnections. All the nodes periodically inform the Master as to which of their ports are still to be discovered, thereby prompting the Master to send VM signals in their direction.

Figure 3:
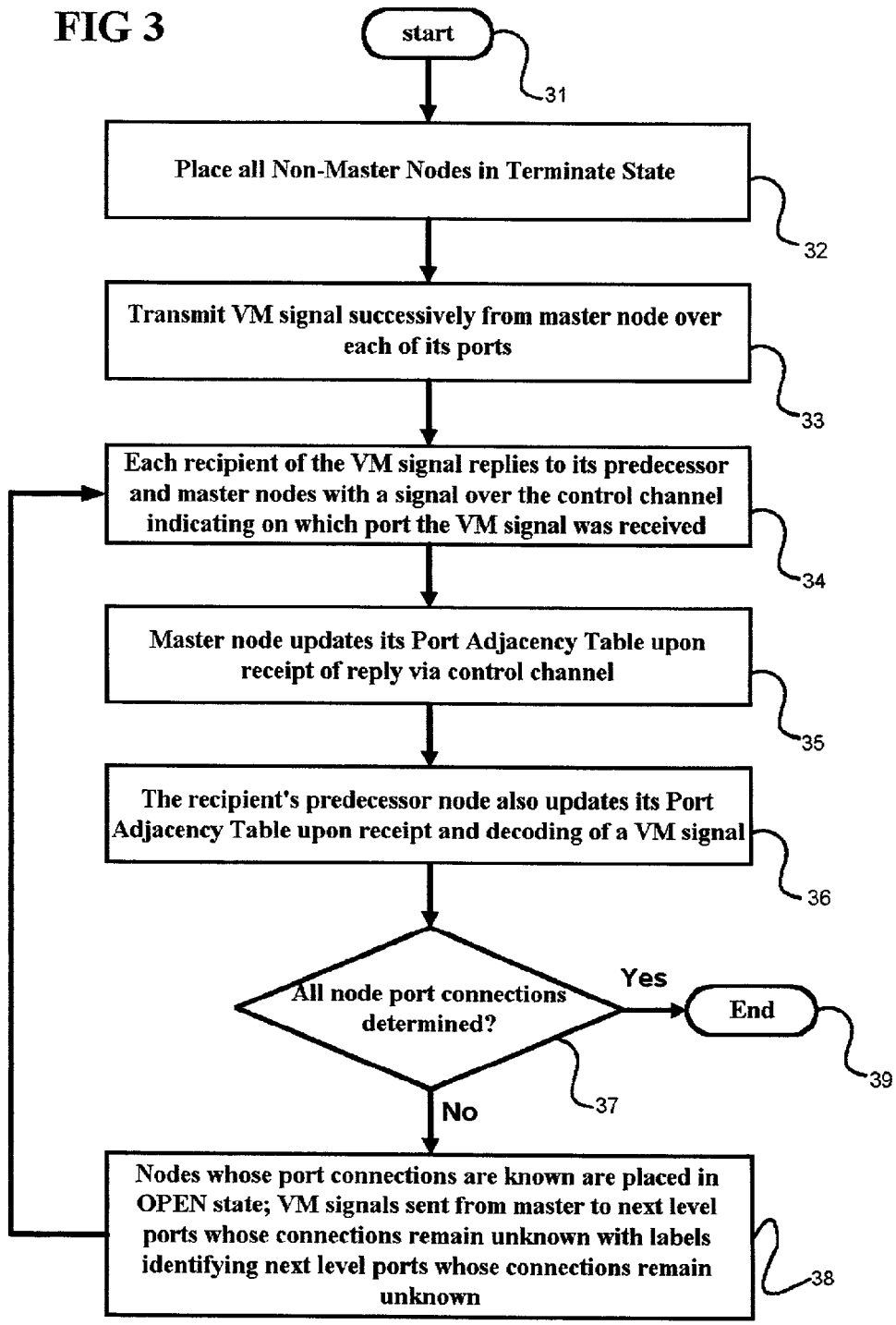
FIG. 3 depicts an exemplary embodiment of a method according to one aspect of the present invention.

Turning to FIG. 3, shown therein is a method for automatically discovering the port interconnections in a network whose nodes and port connections are totally unknown. As part of the network initialization, each node is designated either a master node or a non-master (sometimes known as slave) mode. Each network, or network neighborhood, has a designated master node. The remaining nodes are non-master or slave nodes. Each node knows which node in the network or network neighborhood is the master node and what type of node it is designated. Typically, the master nodes have the CIC cards with the ability to generate the above-described variable modulation signal. Moreover, each node has a communication channel to the master node (or its neighboring node) via the control channel.

When a network is first initialized, the nodes do not know the ports of other nodes to which their ports are connected. Upon startup, each node sends a connection request to the master node indicating the ports in it and requesting information as to which other nodes' ports its ports are connected. Upon receipt of all of these requests, the master node creates a port adjacency table for the network. This table identifies all of the ports in the network for each node, and includes a field for the node/port to which each port is connected. As information is collected regarding these connections, the master node updates this table.

Referring to FIG. 3, the process begins in step 31. First, all ports in all non-master nodes are placed in the TERMINATE state (step 32). This ensures that signals will only reach the nodes neighboring the master node (also referred to as the first level nodes).

The master node discovers all of its port connections by successively transmitting the variable modulation signal to all of its ports (step 33). The master node transmits successively over each of its nodes a predetermined signal, e.g., the variable modulation signal discussed above. The predetermined signal has encoded thereon the node and port from which the signal originates. The signal is then transmitted from this port to the connection at the other end of the port.

Upon receipt of this predetermined signal, the recipient node decodes the encoded information and replies with the port on which the predetermined signal was received to the master node via the control channel (step 34).

Now the master node knows which port on the recipient node is connected to the port on which it transmitted the predetermined signal. The master node then updates the port adjacency table (step 35). Each recipient node also updates its port adjacency table (step 36).

The above process continues until all of the ports in the master node's port adjacency table are identified. This is tested throughout the process (step 37). Those ports in those nodes whose port connections are completely known are then placed in the OPEN state, which allows them to pass through VM signals (step 38). The master then successively sends VM signals to the next level nodes whose port connections remain unknown (step 38). The VM signals in these cases are labels with the node/port identification of the ports in the next level whose connections remain unknown. The process returns to step 34 and repeats, whereby the port connections of the next level from the master node should be completely discovered. Again, it is tested whether there remain any ports whose connections are not known. The above process continues to the next level until all port connections are known.

Alternatively, the master node could select a port from the port adjacency table that remains unidentified as to its connection. The master node then addresses the predetermined signal to that port. For example, if node B has a port 3, the connection to which remains undiscovered, the master node transmits the predetermined signal to node B to be transmitted from node B port 3. The recipient of the predetermined signal then informs its predecessor node and the master node via the control channel as to the port on which the predetermined signal encoded with "B3" was received. The predecessor node and the master nodes then update the port adjacency table with this information. This process continues until all undiscovered ports are discovered.

After the initial configuration of a network if a new node comes on-line, then this new node is configured as a Secondary Master. Unlike the Master, the role of a Secondary Master is limited to discovering port inter-connections to its neighbors only. A Secondary Master cannot discover remote nodes port interconnections. The discovery process of the Secondary Master itself is identical to the Master except that it stops after discovering its immediately connected neighbor ports. It should be noted that there might be several Secondary Master nodes in a network, as each newly joined node is configured as a Secondary Master.

If any ports in any nodes remain undiscovered, the node whose port connections remain unknown sends a connection request to the master node and the port connection is thus discovered, as described above.

Although various embodiments are specifically illustrated and described herein, it will be appreciated that modifications and variations of the invention are covered by the above teachings and within the purview of the appended claims without departing from the spirit and intended scope of the invention. For example, while several of the embodiments depict the use of specific data formats and protocols, any formats and protocols will suffice. Moreover, while some of the embodiments describe specific embodiments of ONNs, others apply. Furthermore, these examples should not be interpreted to limit the modifications and variations of the invention covered by the claims but are merely illustrative of possible variations.

What is claimed is:

1. A method for automatically discovering a plurality of port connections in an all-optical communications network communicating data traffic comprising:
   a) transmitting successively a predetermined signal, having a label identifying at least an originating node and outgoing port, over each of a plurality of outgoing ports of a master node;
   b) replying from each recipient of the predetermined signal via a control channel indicating on which incoming port for each recipient the predetermined signal with a given label was received;
   c) updating a port adjacency table in at least the master node upon receipt of the reply signal;
   d) placing all nodes whose port connections are known in an open state;
   e) transmitting successively a predetermined signal, having a label identifying at least an originating node and outgoing port, over one or more of a plurality of outgoing ports of a next level node having unknown port connections; and
   f) repeating steps b) through e) until all port connections in all nodes are discovered; and
   wherein all the nodes, including the master node, are each able to communicate the data traffic over bearer channels.

2. The method according to claim 1, wherein said replying occurs from said each recipient to at least the master node.

3. The method according to claim 2, wherein said replying occurs from said each recipient to at least the master node and a predecessor node of said recipient.

4. The method according to claim 1, further comprising placing all non-master nodes in a terminate state before step a) of transmitting.

5. The method according to claim 1, further comprising updating a port adjacency table in the recipient's predecessor node.

6. The method according to claim 1, further comprising designating a new node that comes online in the all-optical communications network as a secondary master node, and limiting a port interconnection discovery capability of the secondary master node to only immediate neighbors of the secondary master node.

7. The method of claim 1 wherein all the nodes in the network are configured with information identifying the master node.

8. The method of claim 1 further comprising placing all non-master nodes in a terminate state before step a) of transmitting and placing all ports in the master node in an open state before step a) of transmitting.

* * * * *